United States Patent Office 3,426,047
Patented Feb. 4, 1969

3,426,047
ANTHRAQUINONE DYESTUFF MANUFACTURE
Guido R. Genta, Lock Haven, Pa., assignor to American Aniline Products, Inc., a corporation of Delaware
No Drawing. Filed Mar. 4, 1965, Ser. No. 437,256
U.S. Cl. 260—376 9 Claims
Int. Cl. C09b 1/14, 1/20, 1/50

ABSTRACT OF THE DISCLOSURE

Anthraquinone dyestups are prepared in quantitative yields by reacting 1-amino-2-phenoxy-4-hydroxyanthraquinone with an acylhalide, such as acetyl chloride, in a thin fluid melt consisting essentially of anhydrous aluminum chloride in admixture with a compound that gives a fluid melt at low temperatures. After the acylation, the resulting diacyl intermediate is separated from the mass by drowning in ice water and filtering. An example of compounds prepared according to the method of the invention is 1-amino-2-(4-acetophenoxy)-4-hydroxyanthraquinone.

---

This invention relates to anthraquinone dyestuffs. In one specific aspect it relates to an improved method of making anthraquinone dyestuffs having a remarkable affinity for polyester fibers and which produce thereon red to bluish-red shades. In another aspect it relates to a novel yellow anthraquinone dye which can be used as such or as an intermediate for making red dyestuffs for coloring aromatic polyesters, in particular, polyethylene terephthalate.

In the copending application of Edgar E. Renfrew and Dominic A. Zanella, Ser. No. 432,850, filed Feb. 15, 1965, and now abandoned, there is described a new class of anthraquinone dyes having the formula:

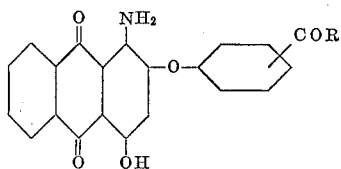

wherein R is an alkyl radical having up to six carbon atoms. One of these dyes, 1-amino-2-(4-acetophenoxy)-4-hydroxyanthraquinone, is outstanding in its effectiveness for coloring Dacron polyester fiber in bluish-red shades. The dyes of Renfrew et al. are made by reacting a 1-amino-2-halo-4-hydroxy-anthraquinone, especially 1-amino-2-bromo-4-hydroxyanthraquinone, with a hydroxyaryl compound containing a —COR group, such as p-hydroxyacetophenone. Unfortunately, the yields obtainable by this method are, at best, about 80 percent of theory and the processing and raw material costs are quite high. A further disadvantage of the method is that p-hydroxyacetophenone and other phenones of this class are not readily available.

I have discovered a novel and economical method of making dyestuffs of the type described by Renfrew et al. from readily available starting material. My new method provides measurably reduced processing costs and a substantially quantitative yield of product. The new method also results in the formation of a heretofore unknown intermediate which is useful per se as a dyestuff.

It is, therefore, an object of the invention to provide a new method for making red to bluish-red colorants for polyester fibers in substantially quantitative yields. It is a further object to provide a new anthraquinone intermediate, useful per se as a dyestuff.

In accordance with the invention I have discovered a method of making anthraquinone dyes of the formula:

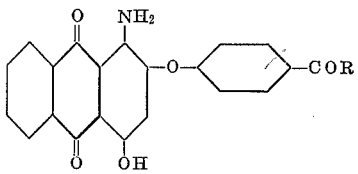

wherein R is either a lower alkyl radical having up to six carbon atoms or a phenyl radical. The method involves reacting 1-amino-2-phenoxy-4-hydroxyanthraquinone with an acyl chloride of the formula RCOCl, in which R is either lower alkyl or phenyl, in a fluid melt of an aluminum halide of the formula AlX$_3$, in which X is either chlorine or bromine. The resulting diacylated intermediate is separated from the melt and subjected to hydrolysis in concentrated sulfuric acid solution. The product anthraquinone dyestuff is then recovered from the reaction mixture in the conventional manner.

My novel acylation technique is quite surprising in view of the known lack of reactivity of phenyl groups and the possibility of destructive side reactions involving amino groups. My reaction proceeds according to the following equation, wherein R is as defined aforesaid:

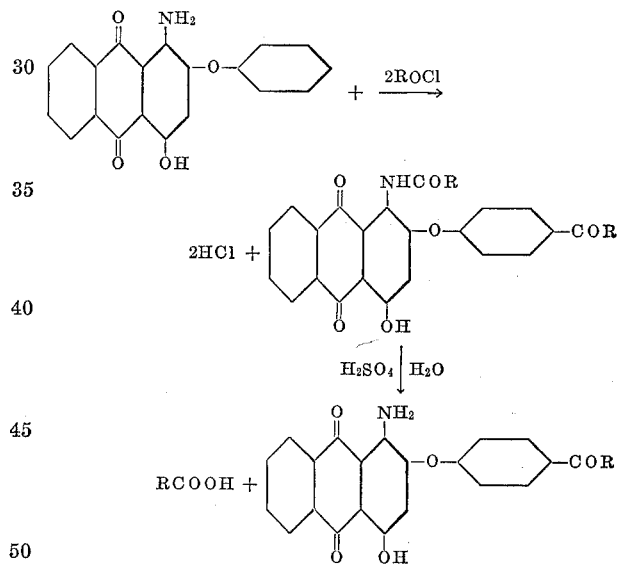

The diacyl intermediate, which can be recovered and used without further processing, is a bright yellow material having excellent dyestuff properties.

The basic reactant for use in the method of the invention is 1 - amino - 2 - phenoxy-4-hydroxyanthraquinone, which is known in the trade as Red FB Base. Useful acyl chlorides are those of the formula RCOCl wherein R is a phenyl radical or an alkyl radical having up to six carbon atoms. Outstanding dyes from the standpoint of the important physical properties of substantivity, light fastness, and resistance to sublimation are made using acetyl chloride and benzoyl chloride as reactants.

The novel acylation of the invention takes place in a thin fluid melt consisting essentially of anhydrous aluminum trichloride or aluminum tribromide in admixture with a compound that gives a fluid melt at a low temperature. The preparation of such melts is well established in the dyestuff art and is described, for example, in Genta patent U.S. 2,650,928, issued Sept. 1, 1953. The fluid character of the melt can be achieved by admixing the anhydrous aluminum trihalide with either an alkali metal halide, $SO_2$, urea, or a tertiary base.

If an alkali metal halide is used to provide the fluid melt, it should be present in an amount of one part by weight alkali metal halide to each 5–10 parts by weight aluminum halide. Useful alkali metal halides include sodium chloride, sodium bromide, potassium chloride, potassium bromide, lithium chloride, and the like.

From a practical standpoint I prefer to make the melt by admixing the aluminum trihalide with a tertiary base which is liquid at a temperature ranging from about 80–130° C. Useful tertiary bases include pyridine, α-piccoline, quinoline, dimethylaniline, diethylaniline, triethylamine, dimethylformamide, and dimethylacetamide. The use of 0.05–0.5 part by weight of the tertiary base to one part by weight of the aluminum halide will provide a satisfactory melt.

The melt is made by charging the anhydrous aluminum halide, in a quantity sufficient to enable mixing of the reactants, e.g. 1–5 parts by weight, based on the weight of the reactants, to a suitable reactor. An appropriate quantity of the compound used to thin the melt, for example, the tertiary base, is added to the aluminum halide. The mixture is heated, conveniently to a temperature of 120–130° C., to provide a uniform thin fluid melt.

The melt is cooled and Red FB Base 1-amino-2phenoxy-4-hydroxy-anthraquinone, is added thereto. The acyl chloride is then added slowly, conveniently dropwise, to control the exothermicity of the reaction, and the temperature of the melt is raised to 110–150° C., preferably to 120–130° C. Sufficient acyl chloride is added to provide substantially stoichiometric quantities of the two reactants. A slight excess of acyl chloride is sometimes helpful in pushing the reaction to completion. The reaction is allowed to continue until acylation is complete, which ordinarily requires two to six hours.

After acylation is complete, the diacyl intermediate is separated from the melt by drowning the reaction mass in ice water and thoroughly agitating the mixture, preferably in the presence of dilute hydrochloric acid. The diacyl compound is separated by filtration, washed acid-free, and excess water is removed therefrom, conveniently by drying at 60–120° C.

The diacyl compound is dissolved in concentrated sulfuric acid along with enough water to effect hydrolysis; i.e., at least one mole of water per mole of compound. The sulfuric acid concentration, including the water for the hydrolysis, should not be less than 70 percent by weight, otherwise hydrolysis does not occur. If the acid is of sufficient concentration, the amount of water present is not critical, provided that there is at least one mole of water per mole of diacyl compound. The acid solution is slowly heated to a temperature between about 30 and 100° C. and maintained at this temperature until hydrolysis occurs, which is usually within ½ to two hours, depending on the temperature and acid concentration. The reaction mass is then drowned in ice water, agitated, and filtered. The filter cake, consisting of the product dyestuff, is washed acid-free with cold water.

The dyestuffs made by the method of the invention are applied to aromatic polyester fibers in the form of a dispersed color powder or paste, which is obtained by wet milling, in a conventional apparatus such as a ball mill, the dye, a dispersant such as sodium lignin sulfonate, and a wetting agent. The dispersed cake or paste thus obtained can be dried, if desired at 70–80° C. and thereafter micro-pulverized. Sufficient dispersant is added to give a dispersed powder containing generally between 50–75 percent by weight active dyestuff base.

The dispersed powder, when added to water with or without auxiliary agents, forms a near colloidal aqueous dispersion from which the aromatic polyester fiber or goods is dyed in the conventional manner to give a fiber containing from 0.01–2 percent dyestuff.

My invention is further illustrated by the following examples:

Example I

A 500 ml. flask was charged with 240 g. anhydrous aluminum chloride. There was then added portionwise 60 g. dimethylacetamide while maintaining the temperature below 120–130° C. A 30 g. quantity of 1-amino-2-phenoxy-4-hydroxyanthraquinone was added after cooling the thin fluid melt to about 55° C. This temperature was maintained for one hour. A 30 g. quantity of acetyl chloride was added dropwise to the melt. The mixture was slowly heated to 125° C. and held at this temperature for a three-hour period. After cooling to 100° C., the melt was poured into 1500 g. of ice water. The flask which had contained the melt was rinsed with some ice water and this, along with 65 g. of 20° Baumé hydrochloric acid, was added to the drowned mass. The mass was agitated overnight and filtered to separate the diacetyl compound. The intermediate diacetyl compound was washed acid-free with cold water and dried at 75–80° C. There was thus obtained 37.5 g. (100% of theory) of a diacetyl compound of the formula:

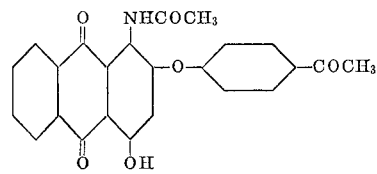

Example II

A 500 ml. flask was charged with 275 g. 98% sulfuric acid and 24 cc. of water. The mixture was cooled to 20° C. and 37.5 g. of the diacetyl compound prepared according to Example I was dissolved therein. The acid solution was slowly heated to 45° C. and maintained at this temperature for one-half hour. The reaction mass was then poured into 1500 g. ice water, agitated for an hour, and filtered to separate the product. The dyestuff, 1-amino-2-(4 - acetophenoxy)-4-hydroxyanthraquinone, was washed acid-free with cold water. The 34.5 g. of pure product thus obtained represented a yield of 100% of theory.

The dye was made into a paste at 16.5% by ball milling 16.5 parts by weight dye for 24 hours with 5 parts sodium lignin sulfonate, available commercially as Marasperse N, 5 parts wetting agent, and 73.5 parts water. The dispersed dyestuff colored Dacron polyester fiber in bluish-red shades of excellent fastness to light and sublimation.

Example III

A 500 ml. flask was charged with 240 g. anhydrous aluminum chloride and 60 g. dimethylacetamide while keeping the temperature below 120° C. The resulting thin fluid melt was cooled to 60–70° C. and 30 g. 1-amino-2-phenoxy-4-hydroxyanthraquinone was added, followed by the dropwise addition of 45 g. of benzoyl chloride. The melt was heated to 125° C. and was held at this temperature for a three-hour period. After cooling to 80° C., the reaction mass was drowned in 4000 g. ice water containing 50 g. of 20° Baumé hydrochloric acid. The diluted mass was stirred overnight, then filtered and washed acid-free. There was thus obtained, after removing excess water, 50 g. of the dibenzoyl intermediate.

A 500 ml. flask was charged with 400 g. 90% sulfuric acid and the 50 g. of dibenzoyl compound, which dissolved in the acid at 25° C. upon standing overnight. The solution was heated to 55° C. and held at this temperature for one hour. After cooling, the mass was drowned in 200 g. ice water, stirred for one hour, and filtered. The filter cake was washed acid-free. There was thus obtained 190 g. of 20 percent cake, corresponding to 38 g. pure dye, or 100 percent of theory. The dyestuff was dispersed in the conventional manner and it dyed Dacron polyester fiber in bright pink shades of excellent fastness to light and sublimation.

Example IV

Similar results are obtained if aluminum tribromide is substituted for the aluminum trichloride used in Example III.

Example V

A substantially quantitative yield of an excellent dye for polyester fibers is obtained if propionoyl chloride is substituted for the benzoyl chloride used in Example III.

I claim:

1. A method of making an anthraquinone dyestuff of the formula:

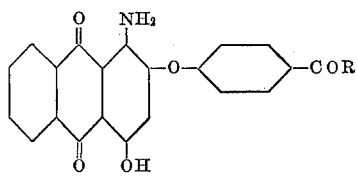

wherein R is a member selected from the group consisting of lower alkyl and phenyl, comprising reacting 1-amino-2-phenoxy-4-hydroxyanthraquinone with an acyl chloride of the formula RCOCl, wherein R is a member selected from the group consisting of lower alkyl and phenyl, in a fluid melt of an aluminum halide of the formula $AlX_3$, wherein X is a member selected from the group consisting of Cl and Br, separating the resulting diacylated intermediate from the melt, subjecting said intermediate to hydrolysis in concentrated sulfuric acid solution containing at least one mole of water per mole of intermediate, and recovering the product anthraquinone dyestuff from the reaction mixture.

2. A method of making an anthraquinone dyestuff of the formula:

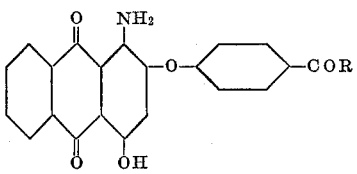

wherein R is a member selected from the group consisting of lower alkyl and phenyl, comprising reacting at a temperature of 110–150° C. 1-amino-2-phenoxy-4-hydroxyanthraquinone with at least a stoichiometric quantity of an acyl chloride of the formula RCOCl, wherein R is a member selected from the group consisting of lower alkyl and phenyl, in a thin fluid melt of an aluminum halide of the formula $AlX_3$, wherein X is a member selected from the group consisting of Cl and Br, separating the resulting diacylated intermediate from the melt, subjecting said intermediate to hydrolysis in sulfuric acid solution of at least 70% concentration by weight, said solution containing at least one mole of water per mole of intermediate, and recovering the product anthraquinone dyestuff from the reaction mixture.

3. A method of making an anthraquinone dyestuff of the formula:

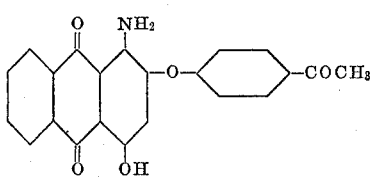

comprising reacting at a temperature of 110–150° C. 1-amino-2-phenoxy-4-hydroxyanthraquinone with at least a stoichiometric quantity of acetyl chloride in a thin fluid melt of anhydrous aluminum trichloride, the fluid character of the melt being achieved by the presence of a compound selected from the group consisting of an alkali metal halide, $SO_2$, urea, and a tertiary base, separating the resulting diacylated intermediate from the melt, subjecting said intermediate to hydrolysis by heating said intermediate to a temperature of 30–100° C. in sulfuric acid of at least 70% concentration by weight, said solution containing at least one mole of water per mole of said intermediate, and recovering the product anthraquinone dyestuff from the reaction mixture.

4. A method according to claim 3 wherein the fluid character of the melt is achieved by the presence of dimethylacetamide.

5. A method of making an anthraquinone dyestuff of the formula:

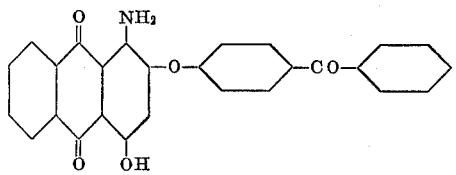

comprising reacting at a temperature of 110–150° C. 1-amino-2-phenoxy-4-hydroxyanthraquinone with at least a stoichiometric quantity of benzoyl chloride in a thin fluid melt of anhydrous aluminum trichloride, the fluid character of the melt being achieved by the presence of a compound selected from the group consisting of an alkali metal halide, $SO_2$, urea, and a tertiary base, separating the resulting diacylated intermediate from the melt, subjecting said intermediate to hydrolysis by heating said intermediate to a temperature of 30–100° C. in sulfuric acid of at least 70% concentration by weight, said solution containing at least one mole of water per mole of said intermediate, and recovering the product anthraquinone dyestuff from the reaction mixture.

6. A method of making an anthraquinone dyestuff of the formula:

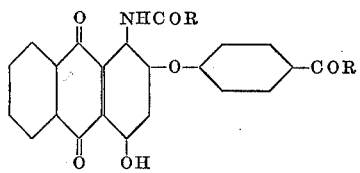

wherein R is a member selected from the group conssiting of lower alkyl and phenyl, comprising reacting 1-amino-2-phenoxy-4-hydroxyanthraquinone with an acyl chloride of the formula RCOCl, wherein R is a member selected from the group consisting of lower alkyl and phenyl, in a fluid melt of an aluminum halide of the formula $AlX_3$, wherein X is a member selected from the group consisting of Cl and Br, and recovering said anthraquinone dyestuff from the reaction mixture.

7. A method of making an anthraquinone dyestuff of the formula:

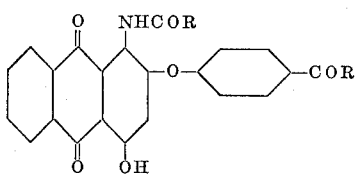

wherein R is a member selected from the group consisting of lower alkyl and phenyl, comprising reacting at a temperature of 110–150° C. 1-amino-2-phenoxy-4-hydroxyanthraquinone with at least a stoichiometric quantity of an acyl chloride of the formula RCOCl, wherein R is a member selected from the group consisting of lower alkyl and phenyl, in a thin fluid melt of an aluminum halide of the formula $AlX_3$, wherein X is a member selected from the group consisting of Cl and Br, and recovering said anthraquinone dyestuff from the reaction mixture.

8. A method of making an anthraquinone dyestuff of the formula:

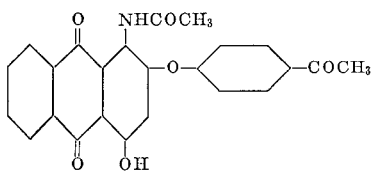

comprising reacting at a temperature of 110–150° C. 1-amino-2-phenoxy-4-hydroxyanthraquinone with at least a stoichiometric quantity of acetyl chloride in a thin fluid melt of anhydrous aluminum trichloride, and recovering the product anthraquinone dyestuff from the reaction mixture.

9. A method of making an anthraquinone dyestuff of the formula:

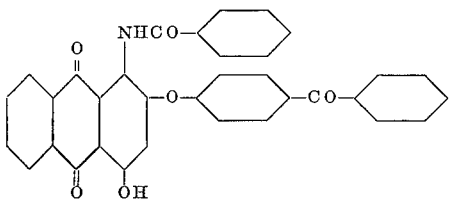

comprising reacting at a temperature of 110–150° C. 1-amino-2-phenoxy-4-hydroxyanthraquinone with at least a stoichiometric quantity of benzoyl chloride in a thin fluid melt of anhydrous aluminum trichloride, and recovering the product anthraquinone dyestuff from the reaction mixture.

References Cited

UNITED STATES PATENTS

| | | | |
|---|---|---|---|
| 1,817,957 | 8/1931 | Zitscher | 260—591 |
| 1,910,470 | 5/1933 | Kraenzlein et al. | 260—591 |
| 2,556,971 | 6/1951 | Moergeli | 260—377 |
| 2,965,653 | 12/1960 | Bloom et al. | 260—377 |
| 3,342,831 | 9/1967 | Braun et al. | 260—371 XR |

OTHER REFERENCES

Houben, J., Das Anthracen und Die Anthrachinone. Leipzig: Georg Thieme Verlag. p. 440 (1929).

LORRAINE A. WEINBERGER, *Primary Examiner.*

H. C. WEGNER, *Assistant Examiner.*

U.S. Cl. X.R.

8—39; 260—377